United States Patent
Chen et al.

(10) Patent No.: US 10,503,902 B2
(45) Date of Patent: Dec. 10, 2019

(54) SYSTEM, APPARATUS AND METHOD FOR DETECTING A DATA-ORIENTED PROGRAMMING ATTACK

(71) Applicant: Intel Corporation, Santa Clara, CA (US)

(72) Inventors: Li Chen, Hillsboro, OR (US); Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 15/452,991

(22) Filed: Mar. 8, 2017

(65) Prior Publication Data
US 2018/0260562 A1    Sep. 13, 2018

(51) Int. Cl.
*G06F 21/55* (2013.01)
*G06F 21/52* (2013.01)
(Continued)

(52) U.S. Cl.
CPC ........ *G06F 21/562* (2013.01); *G06F 11/3692* (2013.01); *G06F 16/9024* (2019.01);
(Continued)

(58) Field of Classification Search
CPC ...... G06F 21/562; G06F 21/52; G06F 21/552; G06F 16/9024; G06F 11/3692;
(Continued)

(56) References Cited

U.S. PATENT DOCUMENTS

| | | | |
|---|---|---|---|
| 9,953,158 B1* | 4/2018 | Benameur | G06F 21/52 |
| 2010/0146624 A1* | 6/2010 | Meyer | G06F 11/28 |
| | | | 726/23 |

(Continued)

OTHER PUBLICATIONS

Mojtaba Eskandari and Sattar Hashemi, Metamorphic Malware Detection using Control Flow Graph Mining, Dec. 2011, APA Malware Research Center, Shiraz University, Iran; Downloaded from http://paper.ijcsns.org/07_book/201112/20111201.pdf on Jan. 28, 2019. (Year: 2011).*

(Continued)

*Primary Examiner* — Michael Simitoski
(74) *Attorney, Agent, or Firm* — Trop, Pruner & Hu, P.C.

(57) ABSTRACT

In one embodiments, an apparatus includes: an execution circuit to execute a program; a monitor circuit to monitor the program execution to obtain information regarding a plurality of control transfers incurred during the execution of the program; a graph generation circuit, based on the information, to generate a plurality of control flow graphs each associated with a portion of the execution of the program; a statistic generation circuit to calculate a plurality of feature vectors each associated with one of the plurality of control flow graphs, each of the plurality of feature vectors including a plurality of graph statistics based on the associated control flow graph; and a comparison circuit to compare at least some of the plurality of graph statistics of one or more of the plurality of feature vectors to corresponding graph statistics of a statistical model of the execution of the program, to identify whether an anomaly has occurred in the execution of the program. Other embodiments are described and claimed.

19 Claims, 9 Drawing Sheets

(51) Int. Cl.
*G06F 21/56* (2013.01)
*G06F 11/36* (2006.01)
*G06F 16/901* (2019.01)
*G06F 11/28* (2006.01)

(52) U.S. Cl.
CPC ............ *G06F 21/52* (2013.01); *G06F 21/552* (2013.01); *G06F 21/566* (2013.01)

(58) Field of Classification Search
CPC .... G06F 21/577; G06F 21/566; G06F 21/556; G06N 20/00
See application file for complete search history.

(56) References Cited

U.S. PATENT DOCUMENTS

| | | | |
|---|---|---|---|
| 2011/0055808 A1* | 3/2011 | Kielstra | G06F 8/443 717/108 |
| 2014/0137130 A1* | 5/2014 | Jacob | G06F 9/46 718/103 |
| 2014/0156972 A1 | 6/2014 | Shanbhogue et al. | |
| 2016/0182558 A1* | 6/2016 | Tripp | H04L 63/1433 726/25 |
| 2016/0253497 A1* | 9/2016 | Christodorescu | G06F 21/554 726/23 |
| 2018/0012020 A1* | 1/2018 | Prvulovic | G06F 21/755 |
| 2018/0136912 A1* | 5/2018 | Venkataramani | G06F 8/35 |
| 2018/0232523 A1* | 8/2018 | Copty | G06F 21/577 |

OTHER PUBLICATIONS

John G. Cleary and Leonard E. Trigg, K*: An Instance-based Learner Using an Entropic Distance Measure, 1995, 12th International Conference on Machine Learning, 108-114. (Year: 1995).*
Bat-Erdene, Munkhbayar, et al. "Entropy analysis to classify unknown packing algorithms for malware detection." International Journal of Information Security 16.3 (2017): 227-248. (Year: 2017).*
Collberg, Christian, et al. "A system for graph-based visualization of the evolution of software." Proceedings of the 2003 ACM symposium on Software visualization. ACM, 2003. (Year: 2003).*
Guri, Mordechai, et al. "Bitwhisper: Covert signaling channel between air-gapped computers using thermal manipulations." 2015 IEEE 28th Computer Security Foundations Symposium. IEEE, 2015. (Year: 2015).*
Nandi, Animesh, et al. "Anomaly detection using program control flow graph mining from execution logs." Proceedings of the 22nd ACM SIGKDD International Conference on Knowledge Discovery and Data Mining. ACM, 2016. (Year: 2016).*

* cited by examiner

SYSTEM, APPARATUS AND METHOD FOR DETECTING A DATA-ORIENTED PROGRAMMING ATTACK

TECHNICAL FIELD

Embodiments relate to improving security in computing systems.

BACKGROUND

In computer programming, a program is stored in a memory, and is provided to a processor for execution. The program memory abstractly is formed of two planes: a control plane and a data plane. To enhance security, some processors provide hardware-based techniques to protect control flow integrity of the program. Control flow integrity defenses in general guard the control plane memory from attacks such as return-oriented programming attacks, which seek to alter the control plane. Data-oriented programming attacks are a newly formed class of threats. A data-oriented programming (DOP) attack targets the data plane but still maintains integrity of the control plane. Suitable defenses to DOP attacks have not yet been provided.

DETAILED DESCRIPTION

In various embodiments, techniques are provided to enable data-oriented programming (DOP) attack detection. More specifically, embodiments provide a statistical-based system to identify anomalous execution of a program that may be indicative of a DOP attack.

Such statistical-based techniques may be used since with a DOP attack, although the flow integrity is not violated, the resulting execution behavior becomes probabilistic rather than deterministic. Embodiments thus provide a probabilistic approach to detect a DOP attack. In particular, embodiments provide a system based on graph feature extraction and anomaly detection to dynamically detect unusual behaviors at runtime.

When there is no DOP attack, an execution trace is deterministic. When a DOP attack is present, the execution becomes probabilistic; that means the process of generating a trace graph becomes probabilistic. This distributional change due to a DOP attack results in changes within a set of graph statistics regarding the trace graph, which in an embodiment may be a control flow graph.

Embodiments may generate one or more control flow graphs of program execution, and for each such graph, calculate a set of graph statistics, e.g., as a feature vector to represent the graph. This resulting set of graph statistics may then be compared to a baseline or reference set of graph statistics. Each graph that is generated is transformed from graph space to Euclidean space. These graph statistics reflect changes in program execution as the execution becomes probabilistic under a DOP attack. In many cases, a time series of graph statistics can be calculated for different program phases and/or execution duration. Embodiments may then perform anomaly detection based on these time series of graph statistics to identify unusual behaviors.

Thus embodiments may perform graph feature extraction on trace graphs, which may be performed statically (when the program has completed execution) or dynamically while the program is in execution (during the generation of a processor trace or other program monitoring activity). The resulting graph statistics, e.g., in the form of feature vectors, may then be compared to baseline or reference graph statistics. In some embodiments, classical machine learning algorithms can then proceed on these graphs.

Figure 1A:
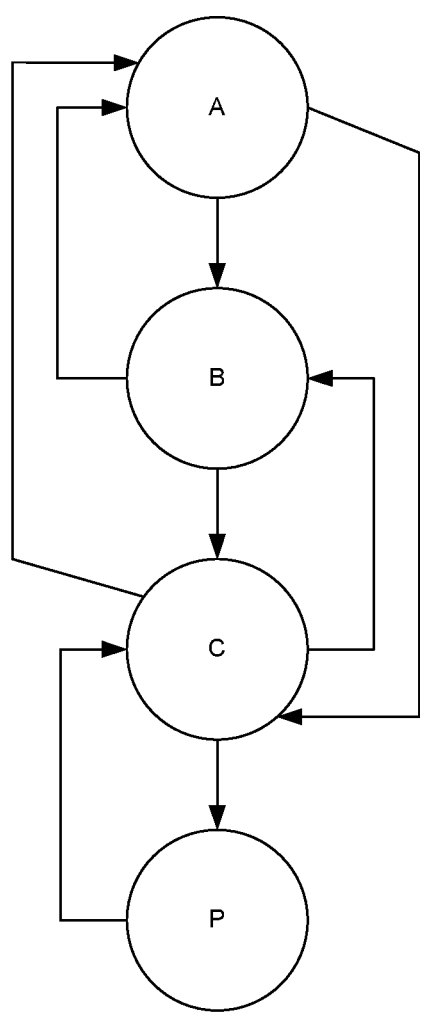
FIG. 1A is a graphical illustration of a control flow graph in the absence of a data-oriented programming attack.

Referring now to FIG. 1A, shown is a graphical illustration of a control flow graph 100. More specifically, control flow graph 100 is generated based on deterministic execution of at least a portion of a program including multiple functions. This deterministic flow occurs since the illustration in FIG. 1 is of a graph 100 of program execution in the absence of a data-oriented programming attack. As seen in the example of FIG. 1A, there are four functions (A, B, C, P), where A, B and C are hidden functions and P is an exported function. The call relationship between the functions are A to B, B to A, B to C, C to B, A to C, C to A, C to P and P to C.

Suppose there is no DOP attack, the call sequence is deterministic. That is, if A has called B, then B will return to A with 100% probability. To place this situation in a probabilistic notation, let E1 denote the event that A calls B, and E2 denote the event B calls to A. Then Prob(E1)=Prob (E2)=1. Given that E1 (A has called B) has occurred, the conditional probability Prob(E2 given E1)=1. Similarly for other conditional probabilities, it is either 0 or 1. In summary, the walk in graph 100, in the absence of a DOP attack, is a deterministic walk.

Figure 1B:
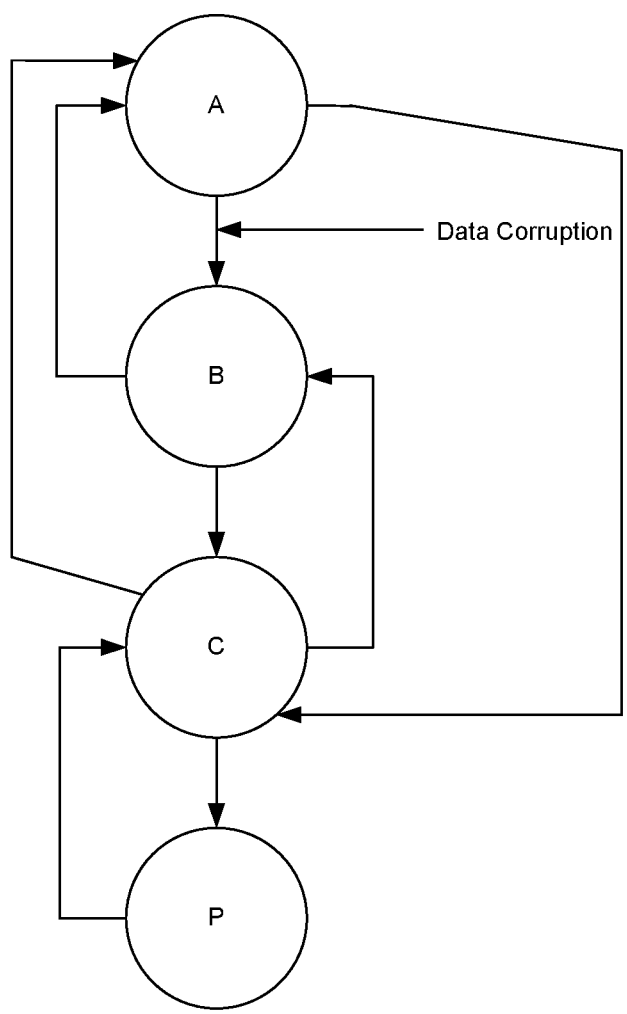
FIG. 1B is a graphical illustration of a control flow graph with a data-oriented programming attack.

Suppose instead that there is DOP attack to this program, as illustrated in FIG. 1B. That is, as illustrated in FIG. 1B, graph 100' indicates that a data corruption occurs in the program such as in the passing of data between function A and function B. In this case, the control flow integrity is maintained. However the walk in the graph is probabilistic. That means when A has called B, B can either call A or C. Given that E1 (A has called B) has occurred, the conditional probability Prob(E2 given E1)=p, where p is a probability between 0 and 1. Similarly all other conditional events are no longer deterministic, and thus the execution paths in the graph become probabilistic. Stated another way, a DOP attack causes data corruption. Nevertheless, the control flow is still maintained and protected. However the execution path (or the walk in graph 100') becomes probabilistic, as the DOP attack changes the underlying probabilistic distribution of the trace execution graphs.

As examples, DOP-based exploits can corrupt data in memory such that parameters that are passed to a function are invalid or pointers may be inappropriately modified. In this way, program flow may proceed with a semantically correct sequence but different underlying probabilities. For example, the number of times that a loop is executed may change due to corrupted parameters or pointer values. In addition, different calls may occur as a result of a memory corruption, changing semantics of the execution without violating control flow integrity. As a result, during the dynamic generation of execution traces, graph statistics will have distributional differences between cases with and without DOP attacks.

Note that DOP attacks may be used to circumvent processor hardware-based control flow integrity (CFI) protection techniques such as instruction-based methods (e.g., ENDBRANCH and ENDRETURN instructions protected by processor hardware), shadow stack techniques and so forth. Using an embodiment, these DOP attacks that may successfully circumvent hardware-based control flow integrity protection can be detected, e.g., at runtime using machine learning and probabilistic techniques.

To provide DOP detection for a given application, dynamic feature engineering may be performed to calculate a time series of graph statistics during runtime. In addition, a normal pattern of program execution may be established as a reference. In an embodiment, a time series of graph statistics for normal execution may be obtained. Thereafter, anomaly detection may be performed for a given input of execution, by comparing calculated graph statistics and the normal behavior baseline reference graph statistics using machine learning (ML)-based detection models. In this way, embodiments provide a warning regarding unusual behaviors due to probabilistic changes in execution based on this analysis, to efficiently detect DOP attacks.

At a high level, an embodiment conducts dynamic feature engineering during the runtime of a program, applies anomaly detection using ML-based models and normal behavioral patterns as reference, and issues an alert where a potential DOP attack is identified, e.g., during runtime.

Embodiments transform a control flow graph to a feature vector by computing graph statistics dynamically. The graph statistics include, in an embodiment, number of vertices, number of edges, density, average degree, diameter (length of the longest geodesic), number of motifs (motifs are small connected subgraphs with a well-defined structure), number of cliques, number of maximum cliques (a clique is maximal if it cannot be extended to a larger clique (the largest cliques are always maximal, but a maximal clique is not necessarily the largest clique), average/standard deviation of vertex betweenness, and average/standard deviation of edge betweenness. Of course, fewer additional or different statistics may be calculated in other embodiments.

For example, given a graph regarding control flow transfers during program execution, a feature vector can be generated based on calculated graph statistics to thus represent the graph. Table 1 below shows a representative feature vector in accordance with an embodiment of the present invention.

TABLE 1

$F_G = (200, 1240, 0.031, 12.4, 3.5, 4, 14627, 4, 888, 137.91, 73.06, 38.29, 7.89)$

This feature vector is thus used to represent a graph. In the example of Table 1, the feature vector includes the following statistics: number of vertices, number of edges, density, average degree, standard deviation of degree, diameter, number of motifs, number of cliques, number of maximal cliques, average betweenness of vertices, standard deviation of vertex betweenness, average of edge betweenness, and standard deviation of edge betweenness.

When a DOP attack occurs, graph statistics due to distributional change will exhibit different patterns compared with the normal patterns. The graph statistics can be readily computed during dynamic mode as a tracing graph is being generated. In this way, a time series of graphs during the execution may be obtained: $G_{T1}, G_{T2}, \ldots, G_{Tn}$, where each is a graph for a given time duration or phase of program execution. From these graphs, a multivariate time series of graph statistics can be calculated. More specifically, each graph $G_{Ti}$ may be used to generate a corresponding feature vector $F_{Ti}$. In a representative embodiment, each feature vector may include the graph statistics described above in Table 1.

Note that a reference template or statistical model may be implemented as a dictionary of normal graph statistics computed from a large set of dynamic trace graphs obtained during execution without attacks. This establishes a baseline reference on what normal patterns look like and enables anomaly detection.

While different comparison techniques may be used to compare a set of graph statistics of a given program execution to reference statistics, in one embodiment a nearest neighbor algorithm may be used. More specifically in an embodiment, a distance to the kth nearest neighbor (NN) can be used as a simple local density estimate for anomaly detection. The larger the distance to the k-NN, the lower the local density, and the more likely the query point is an outlier. Such an anomaly detection model may provide sufficient detection in a computationally efficient manner. In one particular embodiment, a distance value for measuring nearness in a nearest neighbor analysis is a Kullback-Leibler divergence distribution distance, which may be readily calculated.

Embodiments thus may be used to detect data-oriented programming attacks based on observing program execution. This statistical model is thus a probabilistic execution graph of program execution, to be used for anomaly detection. In turn, program execution behaviors can be clustered based on analysis of control flow graphs.

Figure 2:
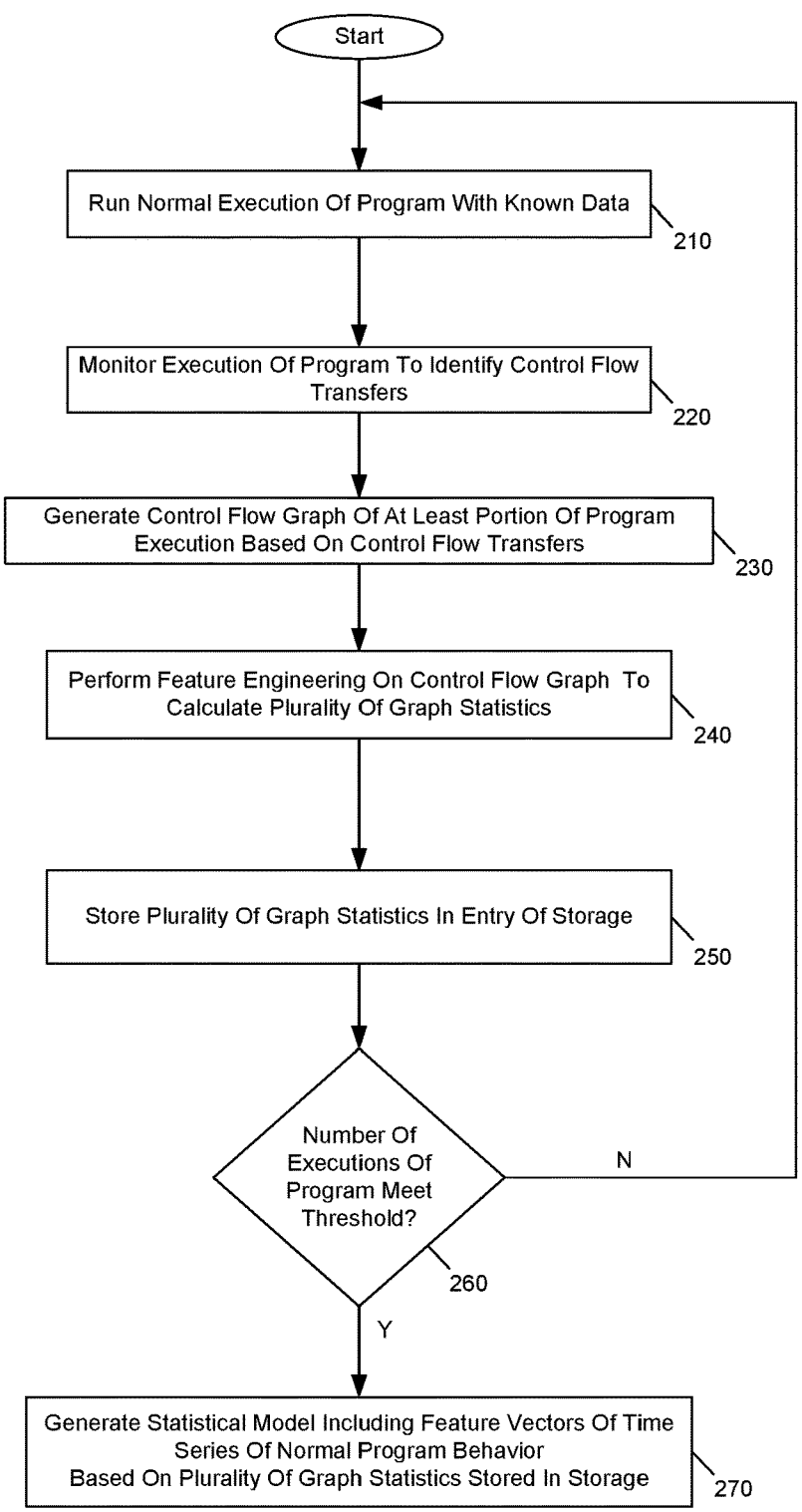
FIG. 2 is a flow diagram of a method in accordance with an embodiment of the present invention.

Referring now to FIG. 2, shown is a flow diagram of a method in accordance with an embodiment of the present invention. More specifically, method 200 shown in FIG. 2 is a method for generating a statistical model of a given application or program under evaluation. In various scenarios, method 200 may be performed by a software vendor of the program. This software vendor may perform method 200 during a testing phase of a program under design. In other cases, the software vendor can perform method 200 on actual workloads using the program after the program has already been finalized or even released. In still further cases, a third party to a software vendor for a particular program, such as a third party security service provider, may perform method 200.

In any event, method 200 may be performed by hardware circuitry, software, firmware and/or combinations thereof. In many cases, method 200 may be performed in a distributed manner, where a large number of runs of the program can be executed on different machines. For example, in a datacenter-type implementation, multiple server computers can execute the program with different representative workloads in order to generate the information described herein. The resulting information may then be processed to generate a statistical model to be used for anomaly detection purposes.

As illustrated, method 200 begins by running a normal execution of the program with known data (block 210).

Understand that the program can take many different forms, including a wide variety of different types of applications or programs for use in many different fields. For purposes of example, assume that a given program under analysis is a web browser or a word processing application. The known data may be a particular web page that is to be accessed and manipulated using the browser application in the browser example. And in the word processing example, a particular document can have word processing functions performed on it. In any event, understand that the normal execution of such program with known data can be performed to exercise the various functions of the program, which generally include an initialization phase, an execution phase and a termination phase. This known data provides typical stimuli for correct execution, and may be used to examine different functionality and ensure that all expected code paths within a given program are executed. Of course for given programs, many different functions available within the program may be tested using a known workload. Note that the term "known workload" means a data set or other information useable with a program, where the information is known to not include a data-oriented programming attack or other data-based anomalies. As such, these known workloads lead to proper normal execution of the program.

Method 200 then proceeds to block 220, which occurs during this execution of the program. Specifically, program execution may be monitored for control transfers that occur during execution. In different implementations, various combinations of hardware circuitry, software and/or firmware may be used to monitor the program execution for control transfers. In some cases, dedicated processor hardware such as control transfer integrity hardware may be used to identify control transfers to ensure that only semantically correct control transfers are allowed (e.g., as indicated by valid control flow integrity instruction handling, shadow stack mechanisms or so forth). In other cases, a program can be instrumented or binary translated to enable monitoring activities associated with control transfers. In still further embodiments, processor tracing mechanisms may be used to monitor program execution for such control transfers. In an embodiment, a representation of control transfer information may be stored in an access controlled system memory.

Still with reference to FIG. 2, control next passes to block 230 where a control flow graph can be generated of at least a portion of the program execution. More specifically, based on the execution and monitoring of control flow transfers, a control flow graph of control transfers encountered during program execution is generated. As is known, a control flow graph may be generated that includes edges between two vertices to represent a given control transfer (namely an edge from a source of a control transfer to a destination or target of the control transfer). Such control transfers can include jumps, calls, returns, and asynchronized control transfers. Note that a single control flow graph of an entire execution of the program may be generated. Or in other embodiments, multiple control flow graphs may be generated for a given program execution, where each of the control flow graphs is associated with a particular portion or phase of the program execution.

Next, control passes to block 240 where feature engineering can be performed on the control flow graph. More specifically, certain features present in the control flow graph can be extracted in order to calculate a plurality of graph statistics of the control flow graph. Although the scope of the present invention is not limited in this regard, feature engineering may be performed to identify a selected set of all available graph statistics. More specifically, these select graph statistics may be selected based at least in part on their suitability or applicability for use in later identifying anomalous events during program execution. In a particular embodiment, this feature engineering may be used to generate a set of graph statistics including those identified above in connection with Table 1.

These selected graph statistics may form a feature vector. Thus as seen in FIG. 2, control passes to block 250 where these selected graph statistics can be stored in an entry of a storage. For example, for the given program execution (or portion of program execution), an entry may be created within a database to store a feature vector for these selected graph statistics.

Still with reference to FIG. 2, control next passes to diamond 260 to determine whether the number of executions of the program meets a threshold. This threshold may be set at a relatively high number, so that a statistically significant large amount of program runs with known data may be performed to enable collection of a statistically significant set of graph statistics. Although the scope of the present invention is not limited in this regard in a particular embodiment this threshold may be set to at least 10,000, and in some cases may be set at much higher levels, e.g., 1,000,000.

With reference still to FIG. 2, if this threshold number of program executions has not yet occurred, control passes back to block 210 discussed above. Otherwise when it is determined that the threshold number of executions has occurred, control passes to block 270 where a statistical model may be generated for the program. Note that this statistical model can be generated using the information in the database regarding the graph statistics. More specifically, in some cases a time series of graph statistics can be generated, where each of these time series is associated with a different portion or phase of program execution. To realize such time series, corresponding graph statistics obtained from the database for the same program phase or portion over multiple runs can be accessed. These multiple sets of graph statistics can then be combined in a statistically appropriate manner, such as averaging. In other cases, instead of an average of these statistical values, a median value of corresponding graph statistics from the multiple accessed feature vectors can be identified, or so forth. In any event, the result is a time series of feature vectors each corresponding to a given program phase or duration. This resulting time series of feature vectors may be stored in a given storage as the statistical model. In an embodiment, this statistical model may take the form of multiple entries each associating a feature vector of a set of graph statistics for a corresponding phase or portion of the program. For example, a separate set of graph statistics can be provided for different program portions, libraries, and so forth.

Understand while shown at this high level in the embodiment of FIG. 2, many variations and alternatives are possible. For example, understand that the resulting statistical model can be dynamically updated over time, based on further normal executions of the program, e.g., with different data sets or workloads. Still further, updates also may occur based on information received from, e.g., customer users of the program, which may provide information regarding anomalous events or other program-relevant information that can be used to generate a more accurate statistical model. This feedback may improve the model by adding or removing different sets of graph statistics. It also can help identify outliers by changing the threshold in the distance metric used in anomaly detection.

Understand that the resulting statistical model may, in many cases, be provided to users of the program (such as end user customers or information technology (IT) personnel, who in turn may be responsible for providing the statistical model to their users). In turn, during execution of the program on such end user's systems, control flow graphs and graph statistics as described herein may be generated (e.g., dynamically during runtime or post-execution). The resulting generated graph statistics can then be compared to the corresponding graph statistics in the statistical model to enable identification of anomalous behavior.

Figure 3:
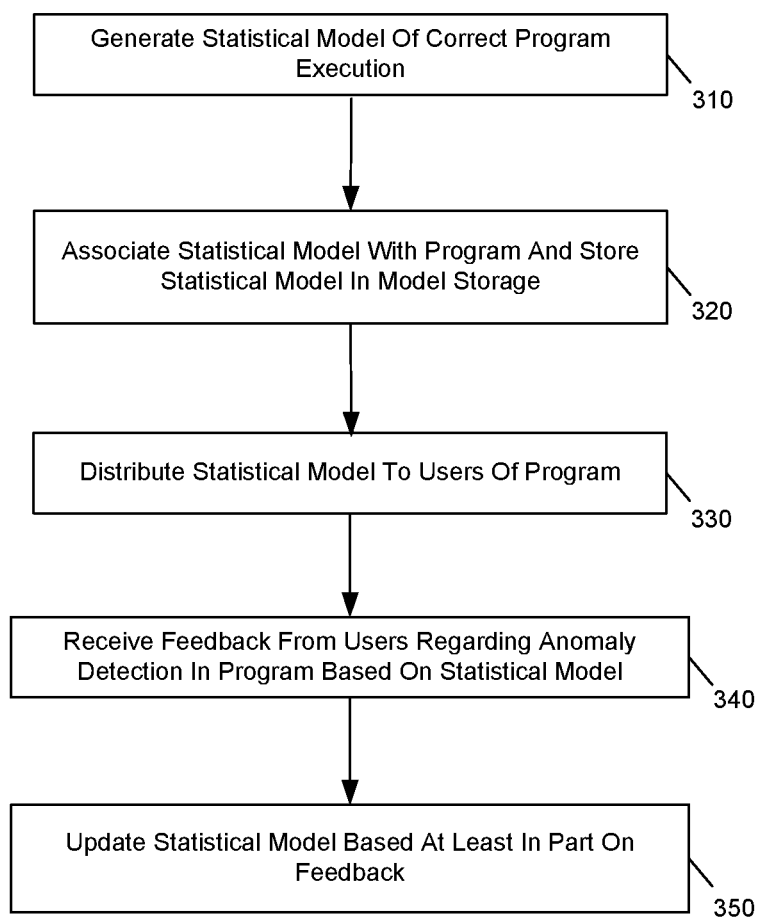
FIG. 3 is a flow diagram of a method in accordance with another embodiment of the present invention.

Referring now to FIG. 3, shown is a flow diagram of a method in accordance with another embodiment of the present invention. More specifically, method 300 shown in FIG. 3 may be performed by a security service provider to generate a statistical model for a given program and then distribute it to users as described herein. Method 300 may be performed by hardware circuitry, software, firmware and/or combinations thereof. As seen, method 300 begins at block 310 by generating a statistical model of correct program execution. In an embodiment, this statistical model may be generated in accordance with method 200 of FIG. 2.

After generation of the statistical model, it may be associated with the program and stored in an entry of a model storage (block 320). For example, the security service provider may house a database such as stored in a cloud-based storage location to maintain a large number of statistical models, each for a given program or application. Thus at block 320 the entity may store the generated statistical model and its association with the program in an entry of this model storage. In various embodiments, the model storage may be implemented as one or more mass storage devices within a datacenter storage implementation, such as a storage area network (SAN) or so forth.

Continuing with the assumption that method 300 is performed by a security service provider, at block 330 this statistical model can be distributed to users of the program. For example, a given end user of a commercially available program may seek to license a security protection service to monitor and protect against data-oriented programming attacks. As such, the parties may enter into some type of agreement, and the user, upon providing payment and identifying information, may download a security protection module, which may include the statistical model as described herein. In addition, the security protection module may further include executable code to enable online monitoring of program execution while the user is running the program, in order to monitor control transfers and generate control flow graphs and graph statistics as described herein. The executable code may further include code (including ML code) to perform comparisons between corresponding graph statistics dynamically generated and the graph statistics of the statistical model, in order to identify a potential data-oriented programming attack. This distribution of the statistical model (and security protection module) can be via a secure channel after proper authentication of the user and/or computing device.

Understand at this point, the user may independently use the security protection module (also referred to as a security monitor) during execution of the program. Assume further that a given user encounters a data-oriented programming attack during program execution. In this case, the security monitor may detect anomalous behavior by departure of dynamically calculated graph statistics with corresponding graph statistics of the statistical model. In this case, method 300 continues at block 340 by the receipt of feedback from the user regarding this anomaly detection. Understand that as this security monitor may be distributed to a large number of end users, IT personnel, and so forth, many different feedback reports may be received. Thereafter, based on the feedback information, it is possible for the security provider to update the statistical model based at least in part on this feedback (block 350). For example, this feedback can be used to modify the set of graph statistics, e.g., to improve their correlation to detect specific families of anomalies. It can also be used to adjust time granularity for graph statistic sampling frequency. Additionally it can be used to adjust the threshold for a divergence distance metric to identify outliers. A security provider may pass this information to an analysis engine and audit the process.

Figure 4:
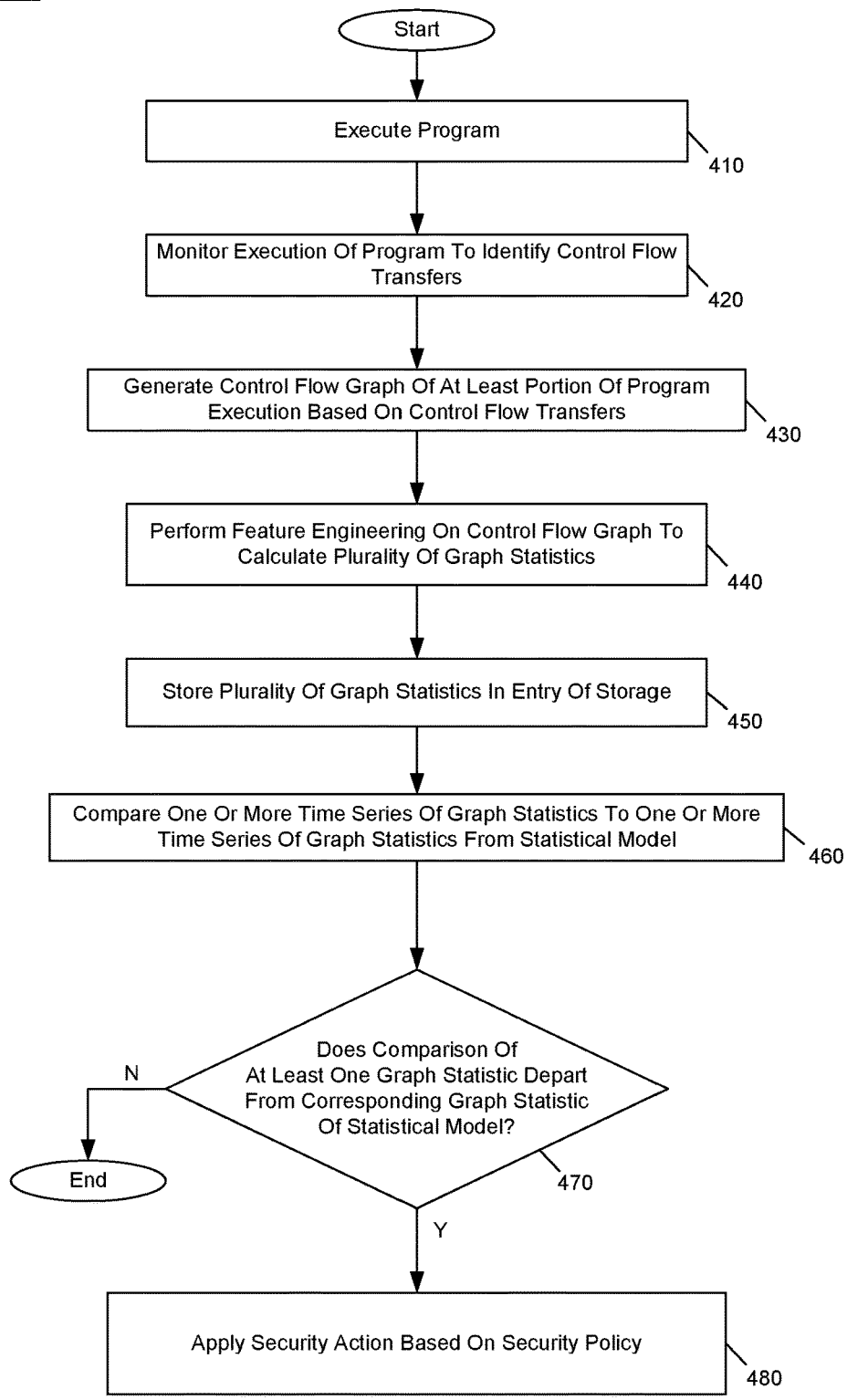
FIG. 4 is a flow diagram of a method for performing anomaly detection associated with a program in accordance with an embodiment.

Referring now to FIG. 4, shown is a flow diagram of a method for performing anomaly detection associated with a program in accordance with an embodiment. More specifically, method 400 shown in FIG. 4 may be performed on an end user computer system to perform statistical-based DOP protection of an application in execution on the computer system. Method 400 may be performed by hardware circuitry, software, firmware and/or combinations thereof. As seen, method 400 begins at block 410 by executing a program. The program may be executed on one or more cores and/or other processing circuitry of one or more processors of the system.

At block 420, program execution may be monitored for control transfers that occur during execution, which may occur as discussed above. Thereafter, control passes to block 430 where a control flow graph can be generated of at least a portion of the program execution. More specifically, based on the execution and monitoring of control flow transfers, a control flow graph of control transfers encountered during program execution is generated. Next at block 440 feature engineering can be performed on the control flow graph in order to calculate a plurality of graph statistics of the control flow graph. These graph statistics can be stored in an entry of a storage (block 450). For example, for a given program execution (or portion of program execution), an entry may be created within a database to store a feature vector for these selected graph statistics.

Still with reference to FIG. 4, at block 460 one or more comparisons may be performed. More specifically, assuming a time series of control flow graphs (and a time series of feature vectors generated from these control flow graphs), comparisons may be made between graph statistics of the feature vectors to corresponding graph statistics of a time series of graph statistics of a statistical model obtained as discussed above (e.g., in FIG. 2). After these comparisons are performed (which may occur dynamically during runtime of the program), next at diamond 470 it can be determined whether at least one of this time series of feature vectors varies by at least a threshold amount from a corresponding feature vector of the time series from the statistical model. In some cases, this determination of variance or departure can be based on comparison of entire sets of feature vectors to each other. In other cases, a departure (e.g., of a threshold level) can be identified when a single graph statistic of a set of graph statistics of a given feature vector varies by at least a threshold amount from a corresponding graph statistic of a feature vector of the statistical model.

Note that this departure or variance from the statistical model may be by a given threshold. In different embodiments, multiple types of thresholds are possible. For example, in some cases variance (that exceeds a given threshold) may be permitted to occur for one or two elements of a time series of graph-based comparisons. However, should the disparity or divergence continue for more than a threshold number of feature vectors from different graphs (e.g., two or three), an anomaly detection may be identified. In other cases, to provide for higher levels of security, even a single variance of one graph statistic of a given feature vector from one control flow graph and a corresponding reference graph statistic can cause an anomaly detection. If such variance is identified, control passes to block 480 where a given security action may be applied based on a security policy. Understand that different types of security policies are possible, ranging from simple notification to the end user of a possible anomaly and/or reporting the same to the security service provider, to more intensive measures such as terminating execution of the program. If no anomaly is detected by way of the comparisons between feature vectors of the generated graph statistics to those of the statistical model, the program may continue execution to termination without any application of any type of security action. Understand while shown at this high level in the embodiment of FIG. 4, many variations and alternatives are possible.

Note that because anomalous detection is based on statistical information, a detection does not necessarily indicate that a data-oriented programming attack has occurred, rather it indicates there is a statistical likelihood of such attack. Accordingly, different security policies may be in place to take appropriate action in response to detection of an anomalous event. In different use cases, to provide heightened security, a security policy may indicate that execution of the program may be terminated. Or another security policy may cause an indication of potential anomalous activity to be communicated to the end user (e.g., by way of display notification), communication of anomalous detection to a monitoring entity (e.g., IT personnel, the entity responsible for generation of the statistical model or so forth), among other security policy actions.

Note that embodiments may extend to classification or clustering analysis beyond anomaly detection. The feature engineering step transforms graph space to Euclidean space, and thus enables machine learning approaches directly on trace graphs. Outside of the DOP-attack context, embodiments can apply classification on trace graphs for automated malware detection, given labels for the training dataset. Embodiments may also apply clustering on trace graphs for automated malware detection, in the absence of labels.

The probabilistic techniques described herein can be interpreted into future processors to reduce the cost of runtime analysis (e.g., by way of processor tracing). In various embodiments, at least some of the processing described herein can be offloaded to one or more accelerators. For example, the graph generation, statistic calculation and pattern matching can be performed away from one or more cores on which the program executes. For example in different embodiments, one or more graphics processors of a multicore processor and/or coupled field programmable gate arrays (FPGAs) can be used to perform analysis in parallel to program execution. In such cases, a given application may execute on one or more cores of one or more multicore processors. In the background of such execution, one or more accelerators, such as graphics processors of the same multicore processors, accelerators of the multicore processors, or even dedicated hardware accelerators, coprocessors or so forth, may perform the control flow graph generation, statistic generation and pattern matching between these generated statistics and corresponding statistics within the statistical model. In this way, efficient program execution may occur on the cores, while the DOP protection techniques described herein can similarly be efficiently performed in the background using these non-core resources.

Figure 5:
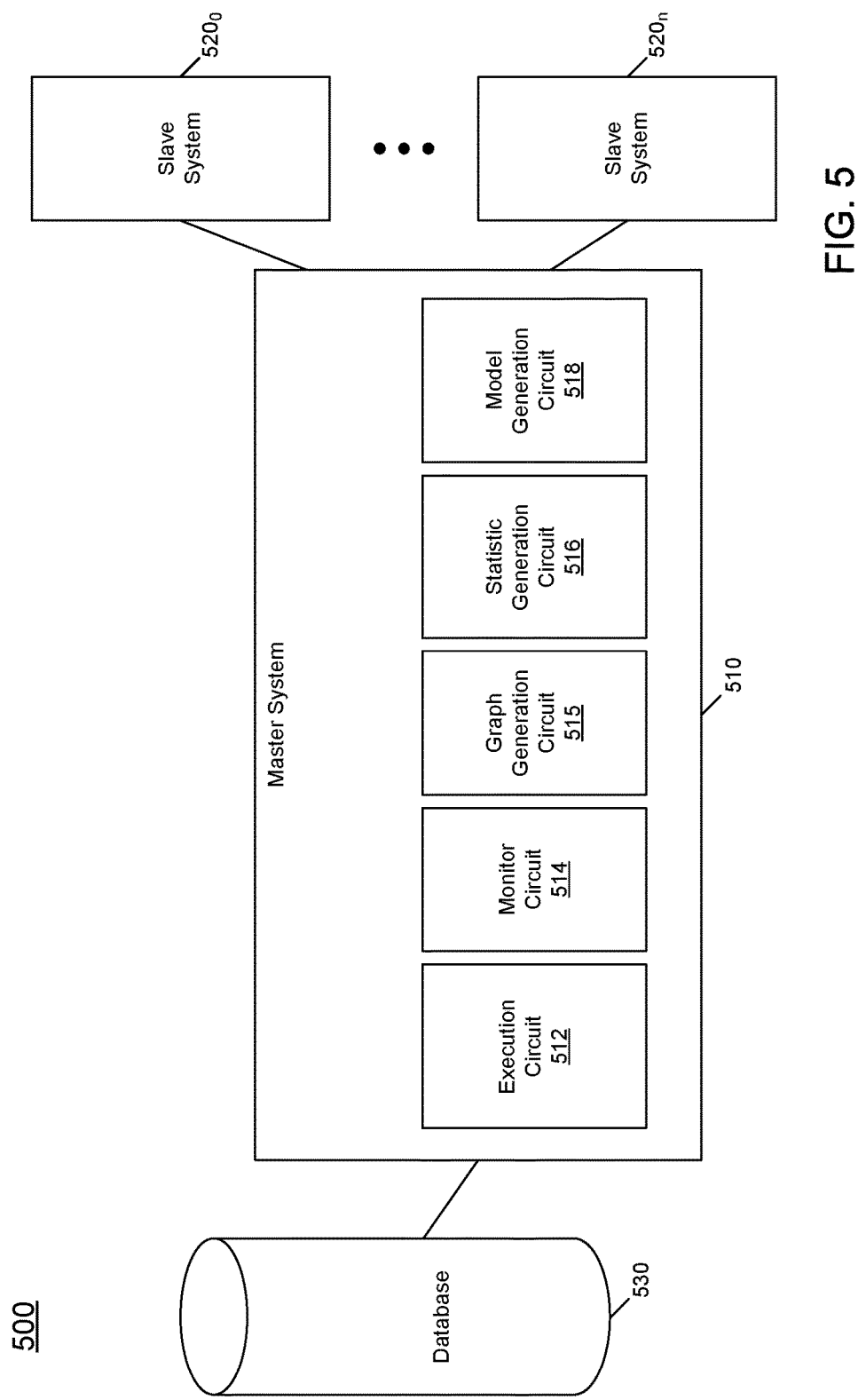
FIG. 5 is a block diagram of a system environment in accordance with an embodiment.

As discussed above, in some cases a security service provider may generate statistical models to be provided to end users or others for given programs. Referring now to FIG. 5, shown is a block diagram of a system environment 500 in accordance with an embodiment. As shown in FIG. 5, environment 500 may be implemented as a set of systems, such as a datacenter-oriented set of server computers and associated storage. In the particular implementation shown in FIG. 5, a master system 510 is present. Master system 510 may be implemented as one or more server computers, each including one or more hardware processors, memory, mass storage, communication devices and so forth.

As shown, system 500 couples to multiple slave systems $520_0$-$520_n$. In various embodiments, these systems also may be implemented as one or more server systems. In turn, at least master system 510 couples to a database 530, which may be configured to store statistical models generated as described herein.

To generate statistical models, master system 510 includes an execution circuit 512, which may run a program with known workloads. During such execution, a monitor circuit 514 may perform monitoring of the program execution to identify control transfers. Based on this control transfer information, a graph generation circuit 515 may generate one or more control flow graphs regarding the program execution. For each such generated control flow graph, a statistic generation circuit 516 may generate a set of graph statistics, e.g., as a feature vector. In turn, these feature vectors may be provided to a model generation circuit 518 that is configured to generate a statistical model from these feature sets. Understand that these feature sets may be combined as appropriate, e.g., by averaging or another statistical process. In this way, model generation circuit 518 can form a statistical model having a time series of graph statistics for different portions or phases of the program execution, different libraries functions, or so forth.

Note that in embodiments, the various circuits described within master system 510 may be implemented within one or more cores of one or more processors of the system. In some cases, additional processing circuitry, such as graphics processors, accelerators, field programmable gate arrays or other programmable logic within master system 510 may perform at least portions of the monitoring, graph generation, statistic generation and model generation.

Understand that slave systems 520 may include similar circuitry to execute the program with known workloads monitor such execution and generate control flow graphs and generate statistics therefrom. In other cases, slave systems 520 may send raw control flow information obtained during program execution to master system 510 to perform the graph generation and statistic generation as described herein.

In any event, when a statistical model for a given program is completed after a large multitude of iterations of the program has been executed with known workloads, the statistical model may be stored in a database 530.

Figure 6:
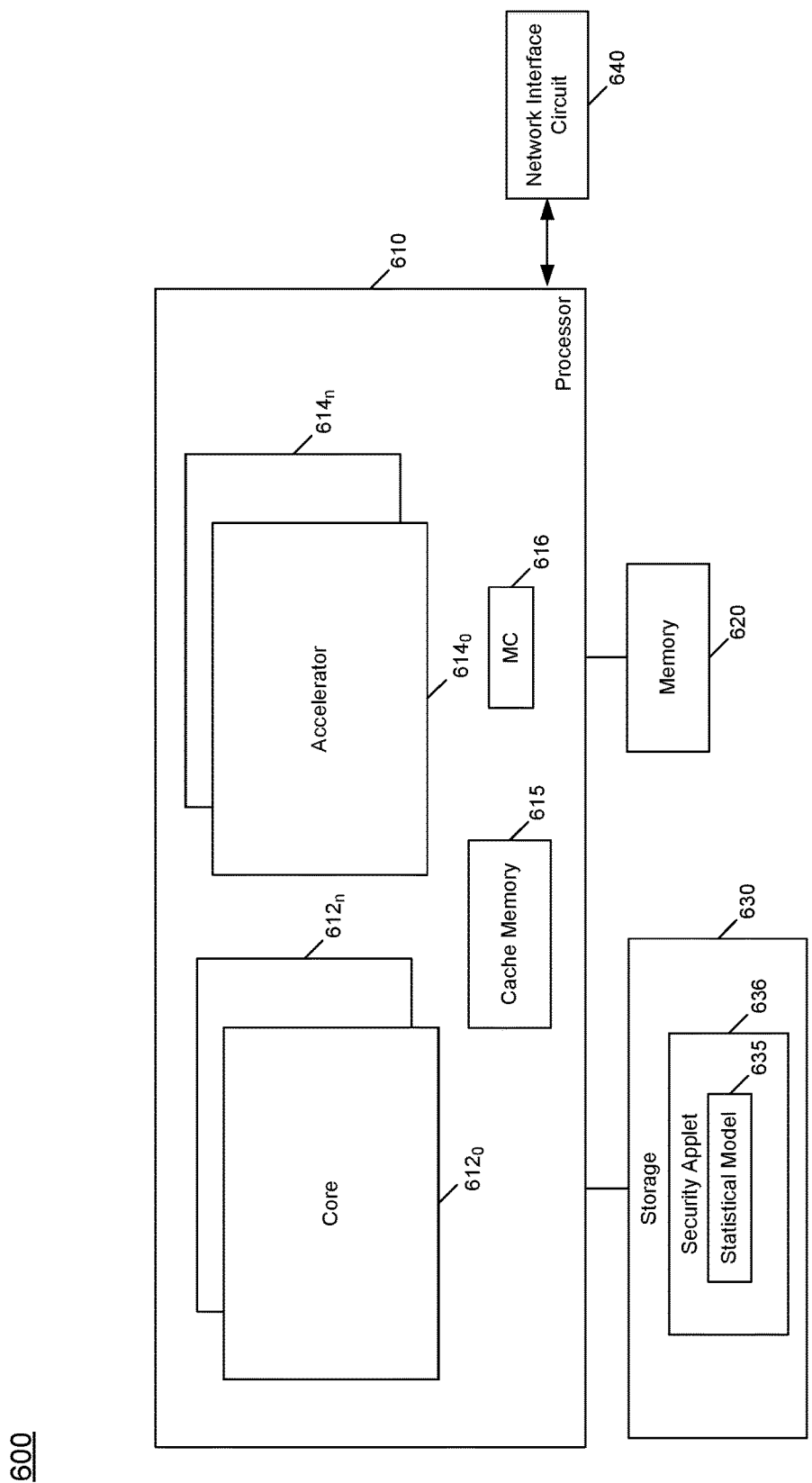
FIG. 6 is a block diagram of a system in accordance with another embodiment.

Referring now to FIG. 6, shown is a block diagram of a system in accordance with another embodiment. As shown in FIG. 6, system 600 may be any type of computing system ranging from a smartphone, tablet computer or portable device to a desktop or server computer. In embodiments herein, system 600 is configured to run one or more programs that can be DOP-protected by way of the statistical protection methods described herein. As illustrated, system 600 includes a processor 610. In embodiments, processor 610 may be a multicore processor including a plurality of cores $612_0$-$612_n$. During operation, a program to be protected by a DOP protection technique as described herein may execute on one or more of cores 612.

Also during runtime, information regarding control transfers incurred during program execution may be communicated to one or more of accelerators $614_0$-$614_n$. In some cases, accelerators 614 can be graphics processors. In other cases, these accelerators can be implemented as field programmable gate arrays (FPGAs) or other programmable logic. By providing these separate processing engines for performing the control flow graph generation, graph statistic generation, and pattern matching between the generated graph statistics and corresponding graph statistics of the statistical model, program execution on cores 612 is not impacted. Note that accelerator 614 may execute machine learning classification algorithms to increase accuracy and efficiency of the pattern matching between generated graph statistics and graph statistics of the statistical model.

In an embodiment, one or more of cores 612 and/or accelerators 614 may include circuitry to perform the DOP protection techniques. To this end, cores 612 may include execution circuitry to execute a given program while cores 612 and/or accelerators 614 may include some or all of monitoring circuitry, graph generation circuitry and statistical generation circuitry. Such circuitry may operate as described above in FIG. 5 with regard to the similar circuitry of master system 510. Furthermore, cores 612 and/or accelerators 614 also may include comparison circuitry, which may be configured to execute machine learning classification algorithms (as an example) to perform pattern matching between dynamically generated graph statistics of control flow graphs generated from the dynamic program execution and corresponding graph statistics of a statistical model, as described herein.

As further illustrated in FIG. 6, processor 610 also includes a cache memory 615 (which may be a shared cache memory, as the cores and accelerators may include one or more levels of private cache memories). Still further, processor 610 includes a memory controller 618 that acts as a control interface to a memory 620, which in an embodiment may be a system memory such as a dynamic random access memory (DRAM) or other type of memory device. A storage 630 couples to processor 610. Storage 630 may take the form of any type of mass storage device to store programs and data. At least one statistical model 635 may be stored within storage 630. As described herein statistical model 635 includes multiple feature vectors such as a time series of feature vectors that provides a statistical basis for analyzing dynamic program execution to identify whether an anomaly indicative of a DOP attack is detected. Note that in embodiments, statistical model 635 may be implemented as part of a security applet 636 or other code. Such code may be downloaded to system 600 as part of a security suite, e.g., associated with one or more specific programs that are to execute on system 600. As further illustrated in FIG. 6, system 600 includes a network interface circuit 640 which may couple to a wide variety of different networks. Network interface circuit 640 may act as an interface to receive security applet 636 or other security application as described herein. Understand while shown at this high level in the embodiment of FIG. 6, many variations and alternatives are possible.

Figure 7:
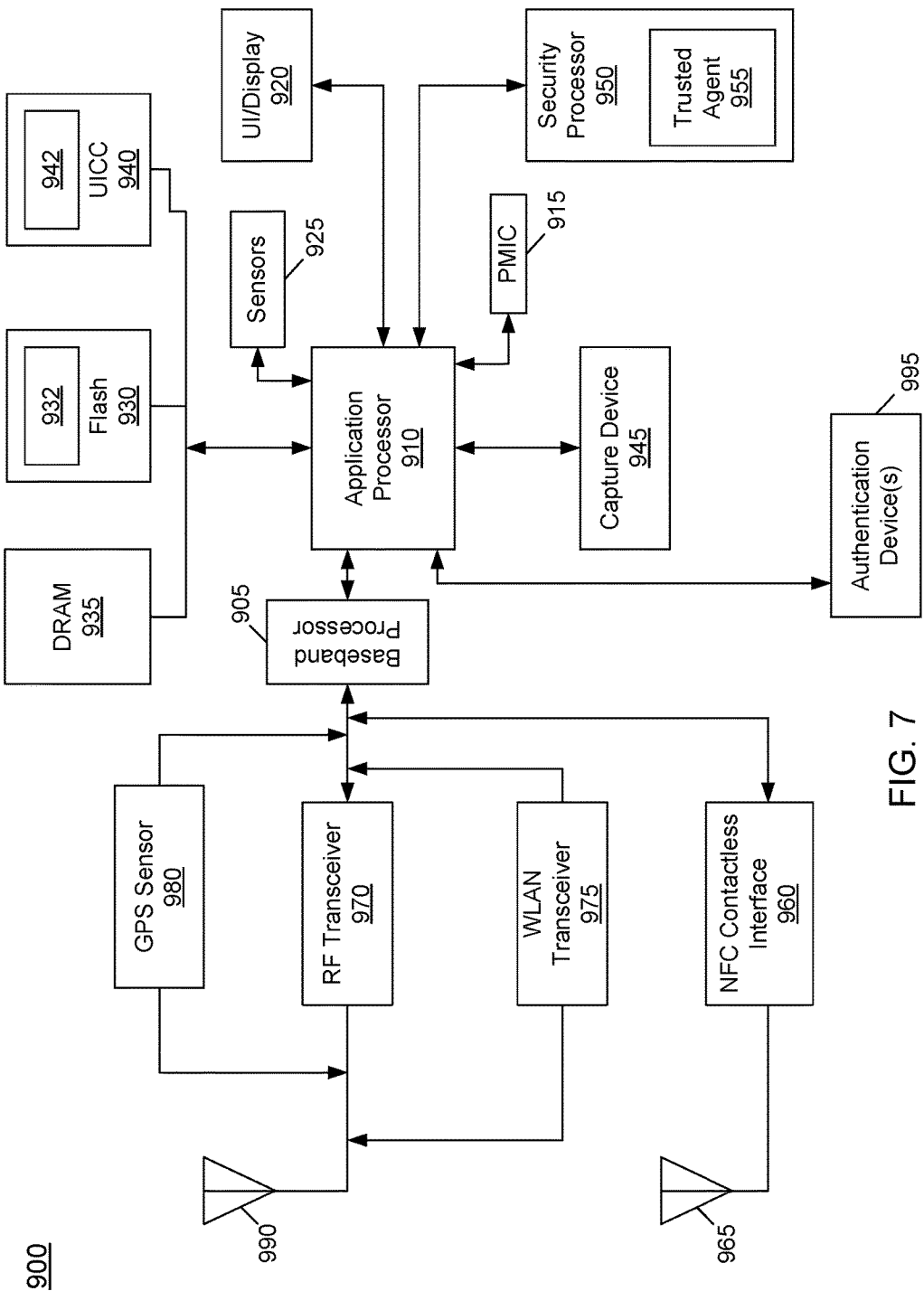
FIG. 7 is a block diagram of an example system with which embodiments can be used.

Referring now to FIG. 7, shown is a block diagram of an example system with which embodiments can be used. As seen, system 900 may be a smartphone or other wireless communicator or any other internet of things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 936 to store one or more statistical models to be used for probabilistic-based DOP protection. As further seen, application processor 910 also couples to a capture device 945 such as one or more image capture devices that can record video and/or still images.

Still referring to FIG. 7, a universal integrated circuit card (UICC) 940 comprises a subscriber identity module, which in some embodiments includes a secure storage 942 to store secure user information. System 900 may further include a security processor 950 that may implement a trusted execution environment (TEE), and which may couple to application processor 910. In one embodiment, security processor 950 may include a trusted agent 955 configured to analyze control flow of a program and compare generated graph statistics to corresponding graph statistics of a statistical model stored in secure portion 936, as described herein. Furthermore, application processor 910 may implement a secure mode of operation, such as Intel® SGX for hosting of a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 7, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more wireless networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 8:
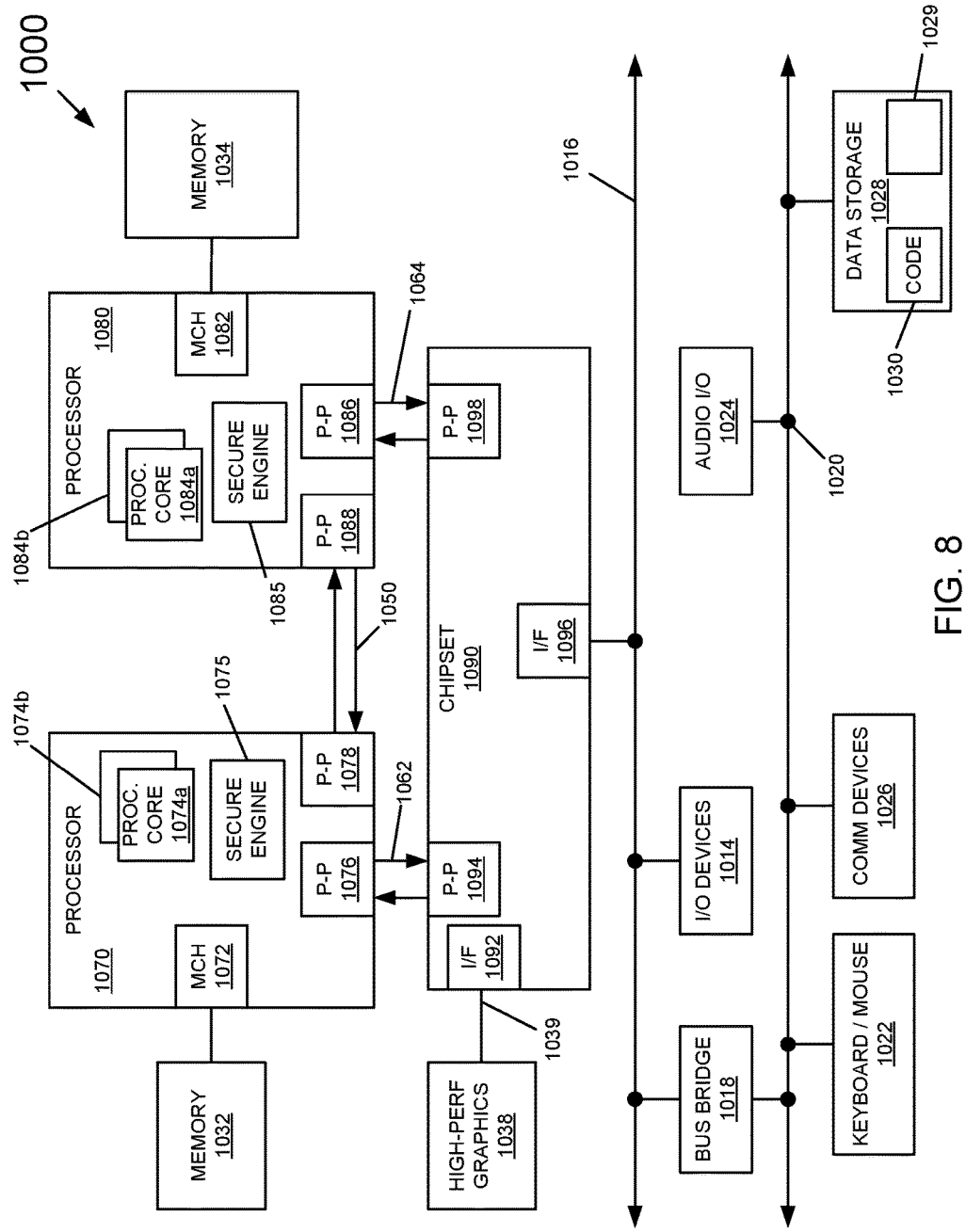
FIG. 8 is a block diagram of a system in accordance with another embodiment of the present invention.

Referring now to FIG. 8, shown is a block diagram of a system in accordance with another embodiment of the present invention. As shown in FIG. 8, multiprocessor system 1000 is a point-to-point interconnect system such as a server system, and includes a first processor 1070 and a second processor 1080 coupled via a point-to-point interconnect 1050. As shown in FIG. 8, each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform security operations including generating statistical models of known and DOP-free execution of a given program over a large number of runs, as described herein.

Still referring to FIG. 8, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 8, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 8, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 8, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

The following examples pertain to further embodiments.

In one example, a method comprises: monitoring execution of a program to obtain information regarding a plurality of control transfers incurred during the execution of the program; generating a control flow graph of at least a portion of the execution of the program based on the information; calculating a plurality of graph statistics based on the control flow graph; and comparing at least some of the plurality of graph statistics to corresponding graph statistics of a statistical model of the execution of the program to identify whether an anomaly has occurred in the execution of the program.

In an example, the method further comprises identifying that the anomaly has occurred in the execution of the program when one or more of the at least some of the plurality of graph statistics vary from the corresponding graph statistics of the statistical model by at least a threshold amount.

In an example, the method further comprises dynamically generating the control flow graph during the execution of the program.

In an example, the method further comprises: generating a time series of control flow graphs of the execution of the program; calculating a time series of the plurality of graph statistics based on the time series of control flow graphs; and comparing the at least some of the graph statistics of the time series of the plurality of graph statistics to corresponding graph statistics of the statistical model.

In an example, the method further comprises identifying that the anomaly has occurred in the execution of the program when at least one of the plurality of graph statistics of a first time series deviates from at least one corresponding graph statistic of the statistical model by at least a threshold amount.

In an example, the statistical model is generated during a plurality of executions of the program that occur without a data-oriented programming attack.

In an example, the anomaly comprises the data-oriented programming attack, and where semantically correct execution of the program is to occur during the data-oriented programming attack.

In an example, the method further comprises: generating a report regarding the anomaly, the report including deviation information regarding deviation of at least one of the at least some of the plurality of graph statistics; and sending the report from the system to a remote entity, where the remote entity generated the statistical model.

In an example, the method further comprises: executing the program on one or more cores of one or more processors of the system; and generating the control flow graph and calculate the plurality of graph statistics on at least one accelerator of the system coupled to the one or more processors.

In an example, the method further comprises terminating the execution of the program in response to identification that the anomaly has occurred in the execution of the program.

In another example, a method comprises: executing, on at least one computer system, a program with a plurality of workloads; monitoring the program execution with the plurality of workloads to obtain information regarding a plurality of control transfers incurred during the execution of the program with the plurality of workloads; generating a plurality of control flow graphs of at least a portion of the execution of the program with the plurality of workloads based on the information; calculating a plurality of graph statistics based on the plurality of control flow graphs; storing the plurality of graph statistics in a storage; and after executing the program with the plurality of workloads, generating a statistical model for the program includes a plurality of feature vectors based on the plurality of graph statistics.

In an example, the method further comprises: generating a time series of the plurality of control flow graphs of the execution of the program with the plurality of workloads; and calculating a time series of the plurality of graph statistics based on the time series of the plurality of control flow graphs.

In an example, the plurality of workloads comprise known workloads without DOP attacks.

In an example, the method further comprises obtaining the plurality of feature vectors based on the plurality of graph statistics.

In an example, the method further comprises forming a first feature vector of the plurality of feature vectors based on a first collection of the plurality of graph statistics, the first collection of the plurality of graph statistics associated with a first phase of the execution of the program.

In an example, the first collection of the plurality of graph statistics are obtained from the execution of the program with a first set of the plurality of workloads.

In an example, the method further comprises sending the statistical model to a remote system to enable the remote system to identify an anomaly indicative of a possible data-oriented programming attack during execution of the program on the remote system.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, an apparatus comprises: an execution circuit to execute a program; a monitor circuit to monitor the execution of the program to obtain information regarding a plurality of control transfers incurred during the execution of the program; a graph generation circuit, based on the information, to generate a plurality of control flow graphs each associated with a portion of the execution of the program; a statistic generation circuit to calculate a plurality of feature vectors each associated with one of the plurality of control flow graphs, where each of the plurality of feature vectors includes a plurality of graph statistics based on the associated control flow graph; and a comparison circuit to compare at least some of the plurality of graph statistics of one or more of the plurality of feature vectors to corresponding graph statistics of a statistical model of the execution of the program, to identify whether an anomaly has occurred in the execution of the program.

In an example, the apparatus is to identify that the anomaly has occurred in the execution of the program when one or more of the at least some of the plurality of graph statistics vary from the corresponding graph statistics of the statistical model by at least a threshold amount.

In an example, the apparatus comprises a processor comprising: at least one core to execute the program, the at least core comprising the execution circuit; and at least one accelerator coupled to the at least one core, the at least one accelerator comprising one or more of the monitor circuit, the graph generation circuit, the statistic generation circuit and the comparison circuit.

In yet another example, an apparatus comprises: means for monitoring execution of a program to obtain information regarding a plurality of control transfers incurred during the execution of the program; means for generating a control flow graph of at least a portion of the execution of the program based on the information; means for calculating a plurality of graph statistics based on the control flow graph; and means for comparing at least some of the plurality of graph statistics to corresponding graph statistics of a statistical model of the execution of the program to identify whether an anomaly has occurred in the execution of the program.

In an example, the apparatus further comprises means for identifying that the anomaly has occurred in the execution of the program when one or more of the at least some of the plurality of graph statistics vary from the corresponding graph statistics of the statistical model by at least a threshold amount.

In an example, the apparatus further comprises means for dynamically generating the control flow graph during the execution of the program.

In an example, the apparatus further comprises: means for generating a time series of control flow graphs of the execution of the program; means for calculating a time series of the plurality of graph statistics based on the time series of control flow graphs; and means for comparing the at least some of the graph statistics of the time series of the plurality of graph statistics to corresponding graph statistics of the statistical model.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a computing system to:
   execute a program on one or more cores of a multicore processor of the computing system;
   monitor the execution of the program to obtain information regarding a plurality of control transfers incurred during the execution of the program;
   generate, on at least one accelerator of the multicore processor of the computing system coupled to the one or more processors, a control flow graph of at least a portion of the execution of the program based on the information;
   calculate, on the at least one accelerator, a plurality of graph statistics based on the control flow graph; and
   compare, on the at least one accelerator, at least some of the plurality of graph statistics to corresponding graph statistics of a statistical model of the execution of the program to identify whether an anomaly has occurred in the execution of the program.

2. The at least one non-transitory computer readable storage medium of claim 1, further comprising instructions that when executed enable the computing system to identify that the anomaly has occurred in the execution of the program when one or more of the at least some of the plurality of graph statistics vary from the corresponding graph statistics of the statistical model by at least a threshold amount.

3. The at least one non-transitory computer readable storage medium of claim 1, further comprising instructions that when executed enable the computing system to:
   generate a time series of control flow graphs of the execution of the program;
   calculate a time series of the plurality of graph statistics based on the time series of control flow graphs; and
   compare the at least some of the graph statistics of the time series of the plurality of graph statistics to corresponding graph statistics of the statistical model.

4. The at least one non-transitory computer readable storage medium of claim 3, further comprising instructions that when executed enable the computing system to identify that the anomaly has occurred in the execution of the program when at least one of the plurality of graph statistics of a first time series deviates from at least one corresponding graph statistic of the statistical model by at least a threshold amount.

5. The at least one non-transitory computer readable storage medium of claim 1, wherein the statistical model is generated during a plurality of executions of the program that occur without a data-oriented programming attack.

6. The at least one non-transitory computer readable storage medium of claim 5, wherein the anomaly comprises the data-oriented programming attack, and wherein semantically correct execution of the program is to occur during the data-oriented programming attack.

7. The at least one non-transitory computer readable storage medium of claim 1, further comprising instructions that when executed enable the computing system to:
   generate a report regarding the anomaly, the report including deviation information regarding deviation of at least one of the at least some of the plurality of graph statistics; and
   send the report from the system to a remote entity, wherein the remote entity generated the statistical model.

8. The at least one non-transitory computer readable storage medium of claim 1, further comprising instructions that when executed enable the computing system to terminate the execution of the program in response to identification that the anomaly has occurred in the execution of the program.

9. The at least one non-transitory computer readable storage medium of claim 1, wherein the plurality of graph statistics comprises at least one of a number of motifs and a number of cliques.

10. The at least one non-transitory computer readable storage medium of claim 1, further comprising instructions that when executed enable the computing system to monitor the execution of the program in a control transfer integrity hardware of the multicore processor.

11. A method comprising:
    executing, on at least one computer system, a program with a plurality of workloads;
    monitoring the program execution with the plurality of workloads to obtain information regarding a plurality of control transfers incurred during the execution of the program with the plurality of workloads;
    generating a time series of a plurality of control flow graphs of at least a portion of the execution of the program with the plurality of workloads based on the information;
    calculating a time series of a plurality of graph statistics based on the time series of the plurality of control flow graphs;
    storing the time series of the plurality of graph statistics in a storage; and
    after executing the program with the plurality of workloads, generating a statistical model for the program, the statistical model including a plurality of feature vectors based on the plurality of graph statistics comprising a first feature vector formed based on combining a first collection of the time series of the plurality of graph statistics, the first collection of the time series of the plurality of graph statistics associated with a first phase of the execution of the program.

12. The method of claim 11, wherein the plurality of workloads comprise known workloads without data-oriented programming (DOP) attacks.

13. The method of claim 11, wherein the first collection of the time series of the plurality of graph statistics are obtained from the execution of the program with a first set of the plurality of workloads.

14. The method of claim 11, further comprising sending the statistical model to a remote system to enable the remote system to identify an anomaly indicative of a possible data-oriented programming attack during execution of the program on the remote system.

15. The method of claim 14, further comprising:
    receiving feedback information regarding anomaly detection based on the statistical model from a plurality of remote systems; and
    updating the statistical model based at least in part on the feedback information.

16. The method of claim 11, wherein the time series of the plurality of graph statistics comprises at least one of a number of motifs and a number of cliques.

17. An apparatus comprising:
    a processor comprising:
       at least one core comprising an execution circuit to execute a program; and
       at least one accelerator coupled to the at least one core, the at least one accelerator comprising one or more of a monitor circuit, a graph generation circuit, a statistic generation circuit and a comparison circuit;

the monitor circuit to monitor the execution of the program to obtain information regarding a plurality of control transfers incurred during the execution of the program;

the graph generation circuit, based on the information, to generate a plurality of control flow graphs each associated with a portion of the execution of the program;

the statistic generation circuit to calculate a plurality of feature vectors each associated with one of the plurality of control flow graphs, wherein each of the plurality of feature vectors includes a plurality of graph statistics based on the associated control flow graph; and the comparison circuit to compare at least some of the plurality of graph statistics of one or more of the plurality of feature vectors to corresponding graph statistics of a statistical model of the execution of the program, to identify whether an anomaly has occurred in the execution of the program.

18. The apparatus of claim 17, wherein the apparatus is to identify that the anomaly has occurred in the execution of the program when one or more of the at least some of the plurality of graph statistics vary from the corresponding graph statistics of the statistical model by at least a threshold amount.

19. The apparatus of claim 17, wherein the plurality of graph statistics comprises at least one of a number of motifs and a number of cliques.

* * * * *